United States Patent
Vijayan et al.

(10) Patent No.: US 9,804,930 B2
(45) Date of Patent: Oct. 31, 2017

(54) PARTIAL FILE RESTORE IN A DATA STORAGE SYSTEM

(71) Applicant: CommVault Systems, Inc., Oceanport, NJ (US)

(72) Inventors: Manoj Kumar Vijayan, Marlboro, NJ (US); Deepak Raghunath Attarde, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 161 days.

(21) Appl. No.: 14/152,843

(22) Filed: Jan. 10, 2014

(65) Prior Publication Data

US 2014/0201153 A1 Jul. 17, 2014

Related U.S. Application Data

(60) Provisional application No. 61/751,680, filed on Jan. 11, 2013.

(51) Int. Cl.
*G06F 7/00* (2006.01)
*G06F 11/14* (2006.01)
*G06F 11/20* (2006.01)

(52) U.S. Cl.
CPC ...... *G06F 11/1456* (2013.01); *G06F 11/1448* (2013.01); *G06F 11/1451* (2013.01);
(Continued)

(58) Field of Classification Search
CPC ............... G06F 11/1456; G06F 13/102; G06F 17/2247; G06F 3/0689
See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

AU 2004227949 10/2004
CA 2498174 3/2004
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Mohammad S Rostami
*Assistant Examiner* — Courtney Harmon
(74) *Attorney, Agent, or Firm* — Knobbe Martens Olson & Bear LLP

(57) ABSTRACT

The data storage system according to certain aspects can implement partial file restore, where only a portion of the secondary copy of a file is restored. Such portion may be designated by one or more application offsets for the file. The system may provide an in-chunk index that includes mapping information between the application offsets and the secondary copy offsets. Chunks may refer to logical data units in which secondary copies are stored, and the in-chunk index for a chunk may be stored in secondary storage with the chunk. Because the mapping information may not be provided at a fixed interval, the system can search through application offsets in the in-chunk index to locate the secondary copy offset corresponding to the portion application offset(s). In this manner, the system may restore the designated portion of the secondary copy in a fast and efficient manner by using the in-chunk index.

20 Claims, 9 Drawing Sheets

(52) U.S. Cl.
CPC ...... *G06F 11/1469* (2013.01); *G06F 11/2094* (2013.01); *G06F 2201/84* (2013.01)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,343,453 B2 | 3/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,653,668 B1 | 1/2010 | Shelat et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,729,926 B1 | 6/2010 | Hopwood | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,606,752 B1 * | 12/2013 | Beatty | G06F 17/30371 707/640 |
| 9,483,489 B2 | 11/2016 | Varadharajan et al. | |
| 2004/0215635 A1 | 10/2004 | Chang et al. | |
| 2006/0224846 A1 * | 10/2006 | Amarendran | G06F 3/0605 711/162 |
| 2007/0203938 A1 | 8/2007 | Prahlad et al. | |
| 2008/0275847 A1 * | 11/2008 | Chellapilla | G06F 17/30949 |
| 2009/0144416 A1 * | 6/2009 | Chatley | G06F 3/0613 709/224 |
| 2009/0319534 A1 | 12/2009 | Gokhale | |
| 2010/0082672 A1 | 4/2010 | Kottomtharayil et al. | |
| 2010/0299490 A1 | 11/2010 | Attarde et al. | |
| 2010/0306412 A1 * | 12/2010 | Therrien | H03M 7/3084 709/247 |
| 2010/0318500 A1 | 12/2010 | Murphy et al. | |
| 2010/0333116 A1 * | 12/2010 | Prahlad | G06F 17/302 719/328 |
| 2011/0161299 A1 | 6/2011 | Prahlad et al. | |
| 2012/0084523 A1 | 4/2012 | Littlefield et al. | |
| 2012/0150818 A1 | 6/2012 | Vijayan et al. | |
| 2012/0150826 A1 | 6/2012 | Vijayan et al. | |
| 2013/0018851 A1 * | 1/2013 | Jayaraman | G06F 17/30159 707/692 |
| 2013/0117255 A1 * | 5/2013 | Liu | G06F 17/30592 707/714 |
| 2013/0262394 A1 | 10/2013 | Kumarasamy et al. | |
| 2014/0041034 A1 * | 2/2014 | Ll | G06F 21/562 726/24 |
| 2014/0201153 A1 | 7/2014 | Vijayan et al. | |
| 2014/0201154 A1 | 7/2014 | Varadharajan et al. | |
| 2014/0201155 A1 | 7/2014 | Vijayan et al. | |
| 2015/0212900 A1 | 7/2015 | Hayasaka et al. | |
| 2017/0090795 A1 | 3/2017 | Varadharajan et al. | |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95,

(56) References Cited

OTHER PUBLICATIONS

Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, May 1991, New York, US, pp. 1-15.

\* cited by examiner

PARTIAL FILE RESTORE IN A DATA STORAGE SYSTEM

INCORPORATION BY REFERENCE TO ANY PRIORITY APPLICATIONS

Any and all priority claims identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

Enterprises may restore backed up data, for example, when the data in primary storage becomes corrupt or unavailable. However, not all of the data may need to be restored. In many cases, users may only want to restore a portion of a file or other data.

SUMMARY

Due to the above challenges, there is a need for restoring portions of files from secondary storage. In order to address these and other challenges, certain storage systems disclosed herein are configured to implement partial file restore. Files in primary storage may be copied to secondary storage (e.g., during a backup or other secondary copy operation). Partial file restore may refer to restoring a portion of the secondary copy of a file or other data unit, instead of the entire secondary copy. Restoring only the desired portion can save a significant amount of time, especially for large files like movie files.

The user may indicate the portion of the secondary copy to restore using an interface of the native application associated with the file. As just one illustrative example, a user drags a playback slider in a graphical user interface (GUI) of a video playback application to begin playing the video at some intermediate point in the video file. And, the intermediate point corresponds to an application offset which designates the starting position for the portion of the file to be restored. However, while the native application can use the application offsets to access selected portions of files, application offsets may not map to corresponding offsets in the secondary copy of the file. For example, secondary copies may include backup-related metadata (e.g., in a header). In addition, the data for the secondary copy may have been deduplicated, compressed, etc. Accordingly, certain embodiments described herein advantageously map between native application offsets and secondary copy offsets, which can allow for access to selected portions of files stored in secondary storage in a fast and efficient manner.

The data storage system according to certain aspects can provide one or more in-chunk indexes that include the mapping information for one or more files. Secondary copies in the system may be stored in logical data units, which may be referred to as "chunks." For instance, secondary copies may be formatted and/or organized as a series of chunks and may be written to secondary storage on a chunk-by-chunk basis. This can facilitate efficient communication and writing to secondary storage. For example, larger chunk sizes can provide better throughput when writing data to secondary storage (e.g., tape media).

Each chunk may have associated metadata information or index files. The in-chunk index for a chunk may be included in the chunk metadata information, or may be an index file associated with the chunk. The in-chunk index can be written to secondary storage with the chunk. The mapping information for a secondary copy can become quite extensive since mapping information can be created for numerous points in the file. Storing the in-chunk index in secondary storage, along with the secondary copy, can provide certain advantages. For instance, this approach can help maintain the sizes of indexes associated with other components in the system (e.g., the storage manager, the media agent, etc.) at manageable levels.

The in-chunk index may include any information relating to mapping between application offsets and secondary copy offsets. For example, the in-chunk index can include a list of application offsets and their corresponding secondary offsets. The in-chunk index may also indicate the physical byte position in the chunk that corresponds to the secondary offset. A file may span across multiple chunks, and the physical byte position information can facilitate locating the actual byte position for the secondary copy offset in a particular chunk. A chunk can include multiple files, and the in-chunk index may include the mapping information for all the files in the chunk. In such cases, the in-chunk index may also indicate which application offsets belong to which files in the chunk.

The in-chunk index may be created and stored while performing a storage operation, such as a backup or an archive operation, and can be accessed at the time of restore in order to find the corresponding secondary copy offset for the user selected application offset. As mentioned above, the user can indicate one or more application offsets for the portion of the file to be restored (e.g., via the application user interface). The mapping information between the application offsets and the secondary copy offsets may not be provided at a fixed interval (e.g., due to the dynamic nature of amount of data written to a buffer during a storage operation). Accordingly, the system may perform a search through various application offsets in the in-chunk index to locate the corresponding secondary copy offset. Various search techniques may be used, including a binary search.

The in-chunk index can be provided at a desired level of granularity depending on the requirements of the system. However, the in-chunk index may not include the exact application offset selected by the user. In such cases, the search through the in-chunk index may locate the nearest secondary copy offset (e.g., the application offset prior to the user selected application offset). The system can provide information about the actual restore application offset so that the application can be aware that the restored portion does not start exactly from the user selected application offset.

In this manner, the data storage system according to certain aspects can restore a portion of a secondary storage file in a fast and efficient manner. By providing mapping information between application offsets and secondary copy offsets, the system can quickly locate the corresponding or nearest secondary copy offset for the user selected application offset. Using the in-chunk index, the system can provide a fast response time for the restore and a positive user experience. In addition, the mapping information may be stored in secondary storage, which can reduce the amount of data included in the storage manager index, media manager index, etc. By allowing partial file restore, the system may reduce the amount of time and resources for restoring files from secondary storage.

According to some embodiments, a method of storing files in secondary storage in a data storage system is provided. The method may include initiating copying of a plurality of files from primary storage to secondary storage, wherein data stored on the secondary storage is organized in one or more chunks, each chunk being a logical data unit. The method may also include copying a first portion of a first file of the plurality of files from the primary storage to a buffer for writing to the secondary storage. The method may further include creating a first entry in an index associated with a first chunk of the one or more chunks, the index stored in association with the first chunk, the first entry corresponding to the first portion of the first file and comprising: a first application offset corresponding to the first portion and associated with a software application used to access the first file; and a first secondary storage offset indicating a location of the first portion within the first chunk in the secondary storage. The method can additionally include copying a second portion of the first file from the primary storage to the buffer for writing to the secondary storage. The method can also include creating a second entry in the index associated with the first chunk, the second entry comprising: a second application offset corresponding to the second portion and associated with the software application; and a second secondary storage offset indicating a location of the second portion within the first chunk in the secondary storage. The method can further include writing the first portion to the location indicated by the first secondary storage offset. The method may additionally include writing the second portion to the location indicated by the second secondary storage offset.

According to certain embodiments, a data storage system for storing files in secondary storage is provided. The system may include a storage manager executing on computer hardware. The storage manager may be configured to initiate copying of a plurality of files from primary storage to secondary storage, wherein data stored on the secondary storage is organized in one or more chunks, each chunk being a logical data unit. The system may also include one or more computing devices comprising computer hardware. The one or more computing devices may be configured to copy a first portion of the first file of the plurality of files from the primary storage to a buffer for writing to the secondary storage. The one or more computing devices may also be configured to create a first entry in an index associated with a first chunk of the one or more chunks, the index stored in association with the first chunk, the first entry corresponding to the first portion of the first file and comprising: a first application offset corresponding to the first portion and associated with a software application used to access the file; and a first secondary storage offset indicating a location of the first portion within the first chunk in the secondary storage. The one or more computing devices can also be configured to copy a second portion of the first file from the primary storage to the buffer for writing to the secondary storage. The one or more computing devices can be further configured to create a second entry in the index associated with the first chunk, the second entry comprising: a second application offset corresponding to the second portion and associated with the software application; and a second secondary storage offset indicating a location of the second portion within the first chunk in the secondary storage. The one or more computing devices can additionally be configured to write the first portion to the location indicated by the first secondary storage offset. The one or more computing devices may be further configured to write the second portion to the location indicated by the second secondary storage offset.

According to other embodiments, a method of partially restoring a secondary copy of a file stored in a data storage system is provided. The method may include receiving an instruction to restore a portion of a secondary copy of a file stored in secondary storage to primary storage for use by a software application, data stored in the secondary storage being organized in one or more chunks, each chunk being a logical data unit, wherein the instruction comprises a starting application offset corresponding to a beginning of the portion of the file to be restored, the starting application offset associated with the software application. The method may also include identifying, using computer hardware, a chunk in the secondary storage that includes a part of the secondary copy corresponding to the starting application offset. The method can also include accessing, using computer hardware, an index stored in association with the chunk, wherein the index comprises a plurality of entries, each entry of the plurality of entries listing and providing a mapping between a respective application offset and a corresponding respective secondary storage offset, the respective application offset associated with the software application, the respective secondary storage offset corresponding to an offset within the secondary copy of the file. The method can further include determining, using computer hardware, a first entry in the plurality of entries that references a respective application offset that corresponds to the starting application offset. The method can additionally include using the respective secondary storage offset of the first entry to restore a portion in the chunk from the secondary storage to the primary storage.

According to some embodiments, a data storage system for partially restoring a secondary copy of a file is provided. The system may include a storage manager executing on computer hardware and configured to receive an instruction to restore a portion of a secondary copy of a file stored in secondary storage to primary storage for use by a software application, data stored in the secondary storage being organized in one or more chunks, each chunk being a logical data unit, wherein the instruction comprises a starting application offset corresponding to a beginning of the portion of the file to be restored, the starting application offset associated with the software application. The system may also include one or more computing devices comprising computer hardware. The one or more computing devices may be configured to identify a chunk in the secondary storage that includes a part of the secondary copy corresponding to the starting application offset. The one or more computing devices may also be configured to access an index stored in association with the chunk, wherein the index comprises a plurality of entries, each entry of the plurality of entries listing and providing a mapping between a respective application offset and a corresponding respective secondary storage offset, the respective application offset associated with the software application, the respective secondary storage offset corresponding to an offset within the secondary copy of the file. The one or more computing devices can also be configured to determine a first entry in the plurality of entries that references a respective application offset that corresponds to the starting application offset. The one or more computing devices can additionally be configured to use the respective secondary storage offset of the first entry to restore a portion in the chunk from the secondary storage to the primary storage.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Systems and methods are described herein for partial restore of secondary storage files. Examples of such systems and methods are discussed in further detail herein, e.g., with respect to FIGS. 2-5. Moreover, it will be appreciated partial file restore may be implemented by information management systems such as those that will now be described with respect to FIGS. 1A-1E. And, as will be described, the componentry for implementing partial file restore can be incorporated into such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
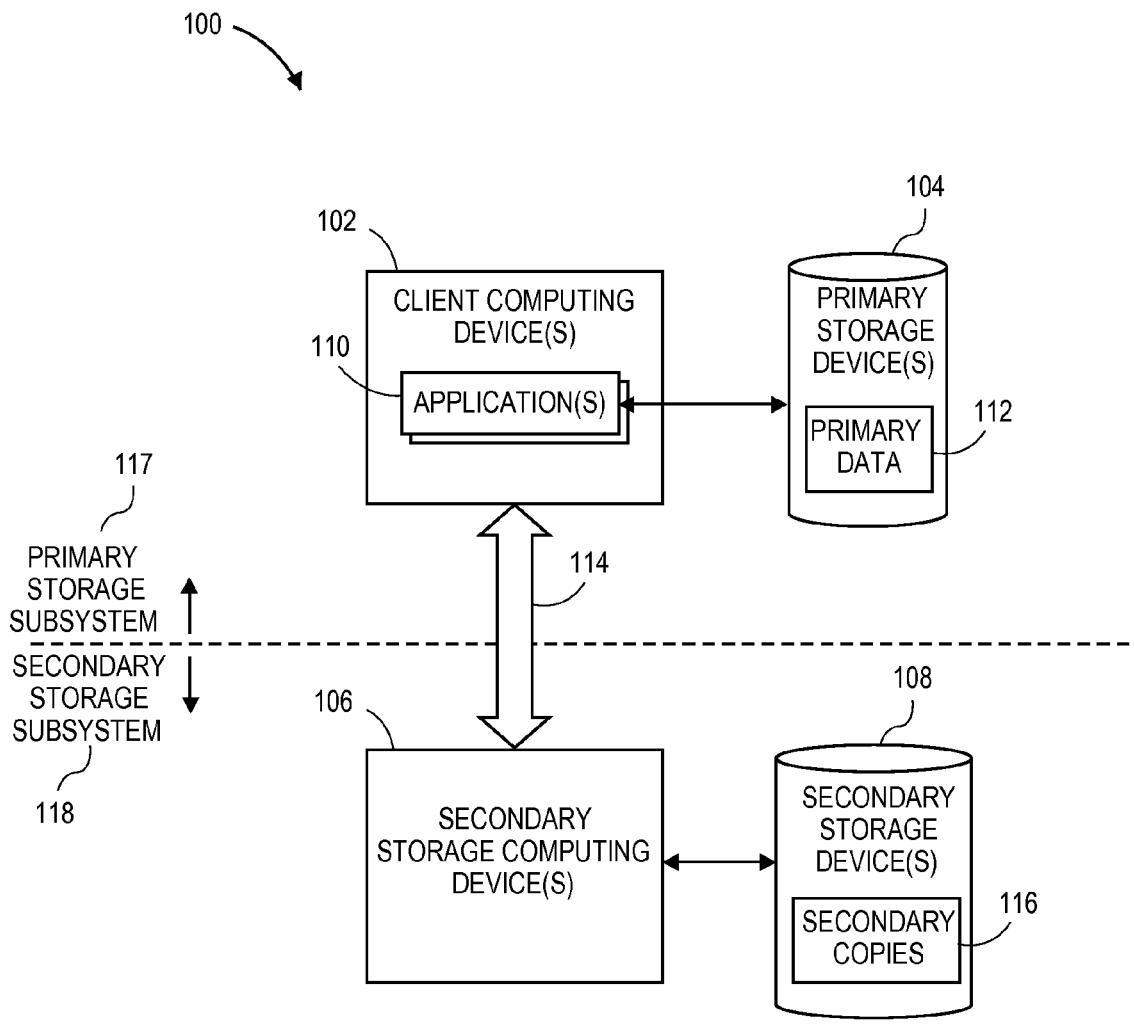
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";
- U.S. Pat. No. 7,246,207, entitled "SYSTEM AND METHOD FOR DYNAMICALLY PERFORMING STORAGE OPERATIONS IN A COMPUTER NETWORK";
- U.S. Pat. No. 7,747,579, entitled "METABASE FOR FACILITATING DATA CLASSIFICATION";
- U.S. Pat. No. 8,229,954, entitled "MANAGING COPIES OF DATA";
- U.S. Pat. No. 7,617,262, entitled "SYSTEM AND METHODS FOR MONITORING APPLICATION DATA IN A DATA REPLICATION SYSTEM";
- U.S. Pat. No. 7,529,782, entitled "SYSTEM AND METHODS FOR PERFORMING A SNAPSHOT AND FOR RESTORING DATA";
- U.S. Pat. No. 8,230,195, entitled "SYSTEM AND METHOD FOR PERFORMING AUXILIARY STORAGE OPERATIONS";

U.S. Pat. Pub. No. 2012/0084268, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLS]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
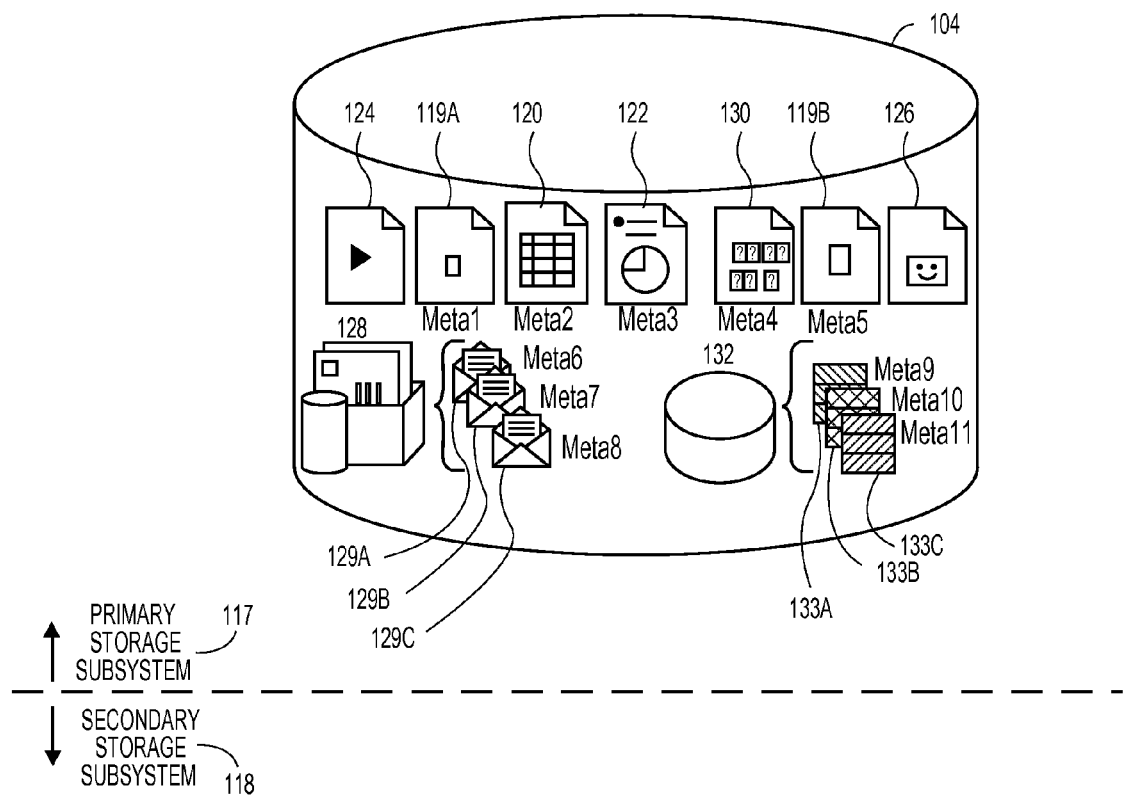
FIG. 1B is a detailed view of a primary storage device, a secondary storage device, and some examples of primary data and secondary copy data.
Figure 1B:
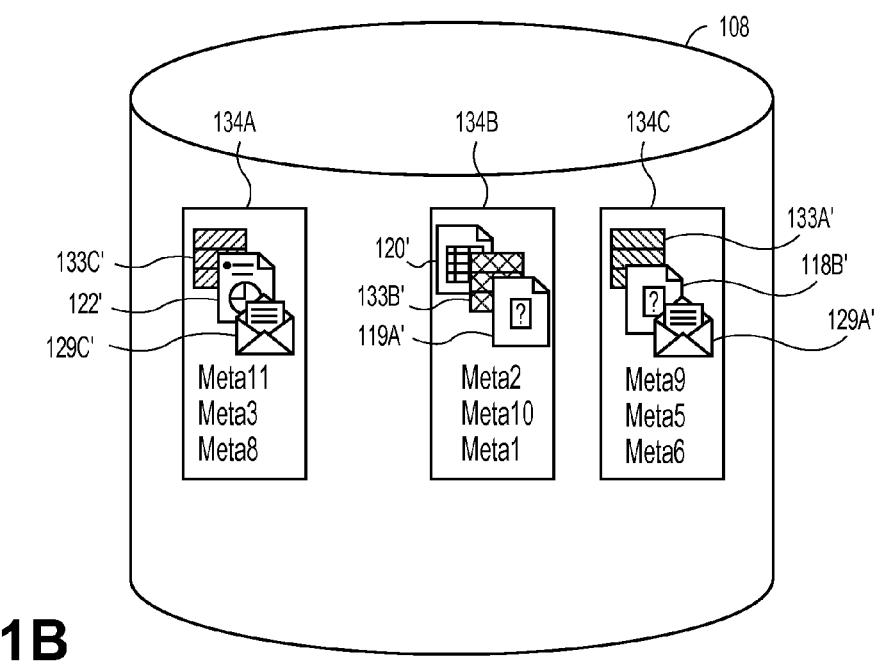

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
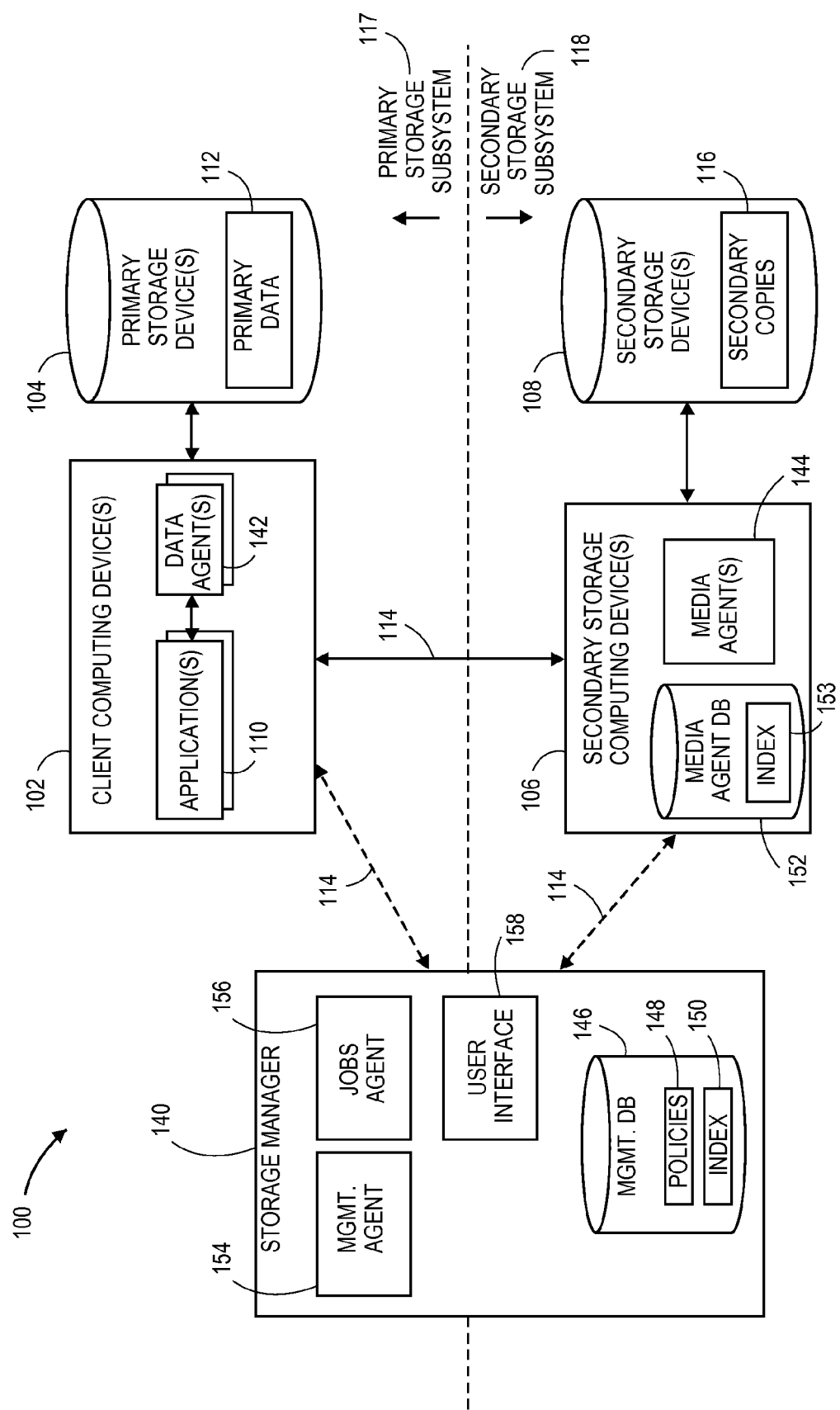
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
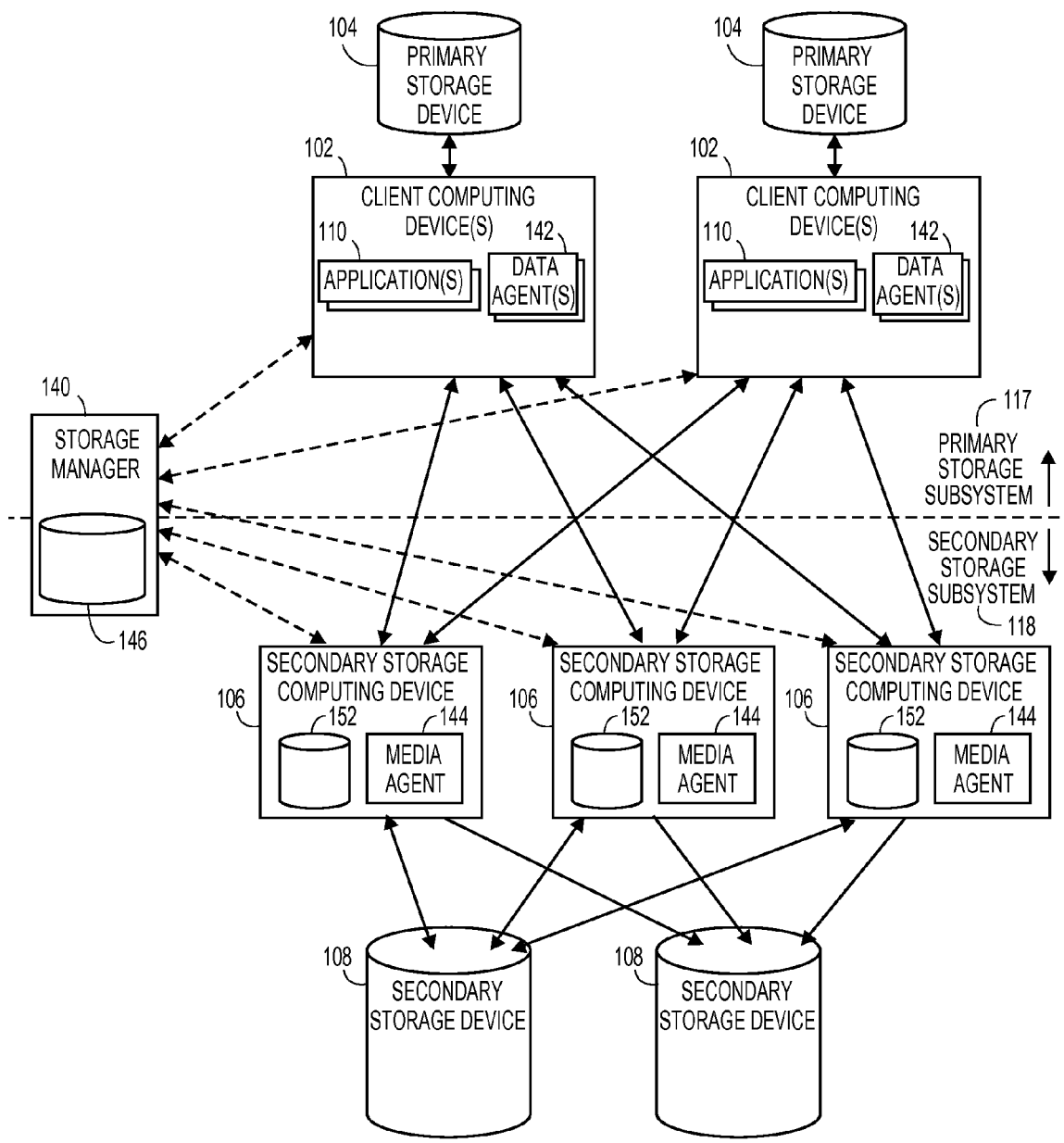
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084268, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
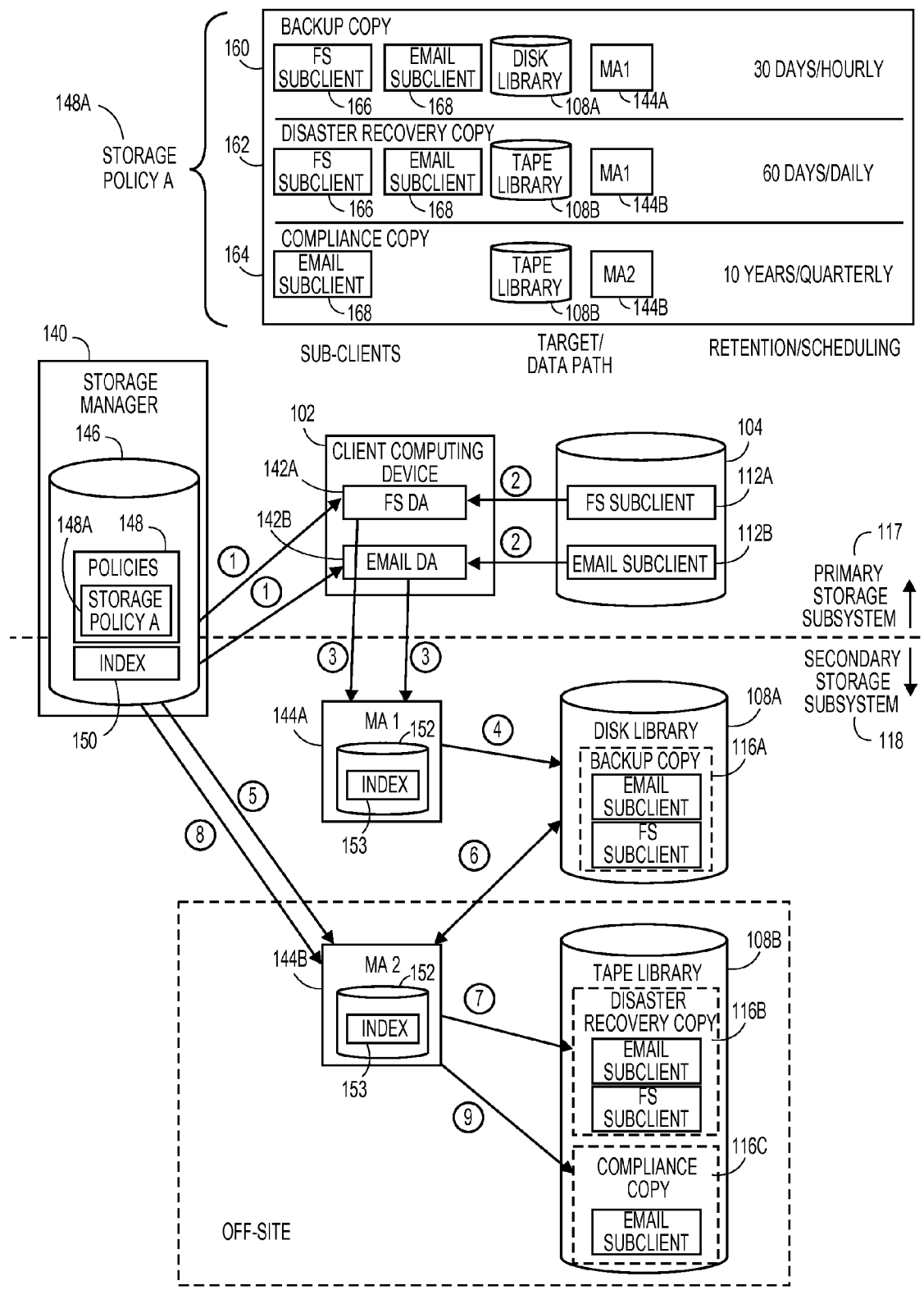
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116b according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116b is a direct, mirror copy of the backup copy 116A, and remains in the backup format. In other embodiments, the disaster recovery copy 116C may be generated in some other manner, such as by using the primary data 112A, 112b from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116b, 116C. As one example, a user may manually initiate a restore of the backup copy 116A by interacting with the user interface 158 of the storage manager 140. The storage manager 140 then accesses data in its index 150 (and/or the respective storage policy 148A)

associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

The systems and methods described with respect to FIGS. 1A-1E can be used for partial file restore. In some embodiments, a partial file restore module is a software module that forms a part of or resides on the storage manager 140 or, alternatively, the media agents 144. The partial file restore module can additionally be a software module executing on one or more of the client computers 102. For instance, in some embodiments, the partial file restore module may be implemented as a part of the data agent 142. Partial file restore will be discussed in more detail with respect to FIGS. 2-5.

An Exemplary Data Storage System for Implementing Partial File Restore

Figure 2:
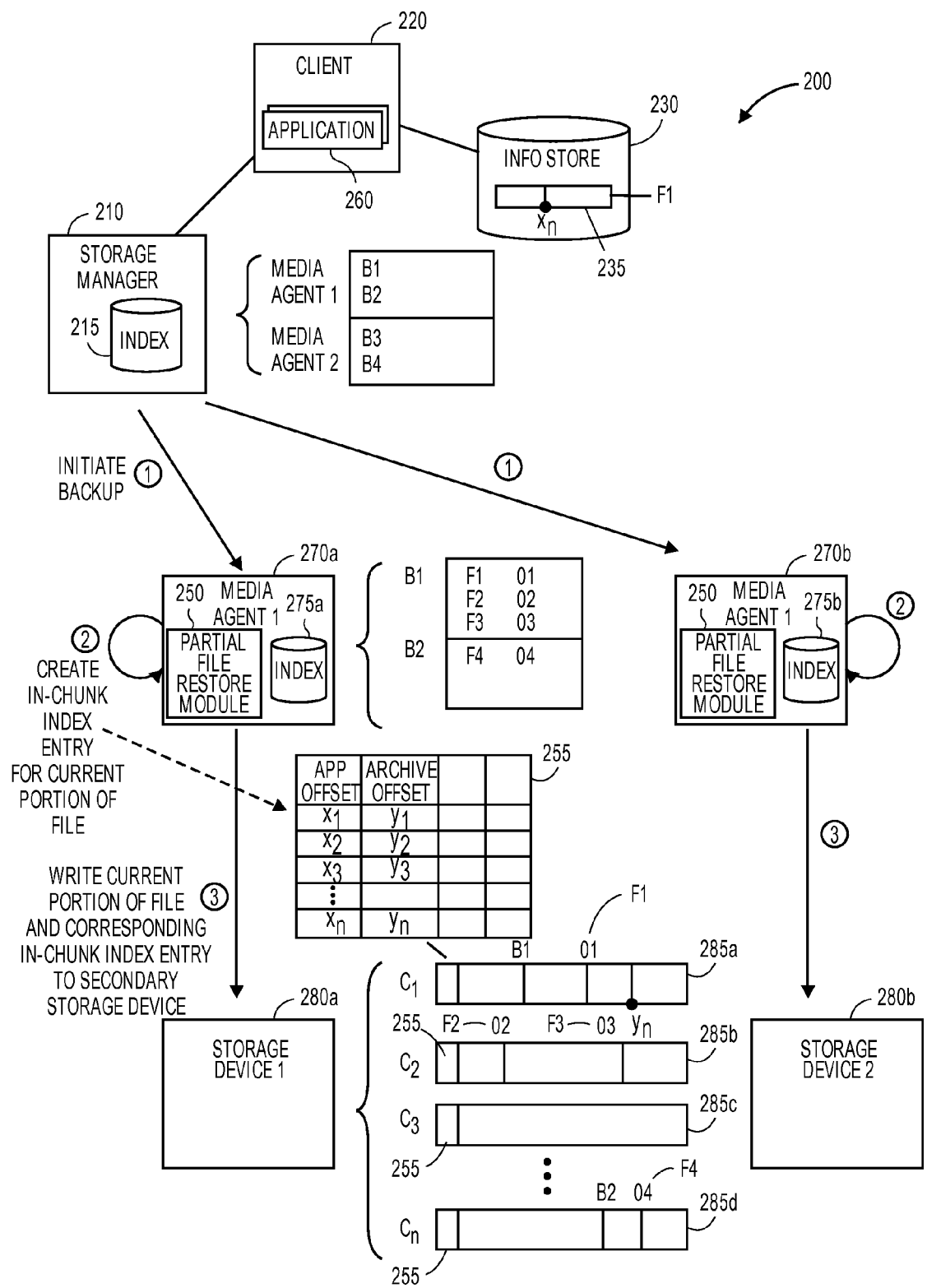
FIG. 2 is a data flow diagram illustrative of the interaction between the various components of an exemplary storage system configured to implement an in-chunk index for partial file restore, according to certain embodiments.

FIG. 2 is a data flow diagram illustrative of the interaction between the various components of an exemplary storage system 200 configured to implement an in-chunk index for partial file restore, according to certain embodiments. As illustrated, the exemplary data storage system 200 includes a storage manager 210, a client 220, an information store 230, one or more partial file restore modules 250, one or more applications 260, one or more media agents 270, and one or more secondary storage devices 280. The system 200 and corresponding components of FIG. 2 may be similar to or the same as the system 100 and similarly named components of FIG. 1D. Moreover, depending on the embodiment, the system 200 of FIG. 2 may additionally include any of the other components shown in FIG. 1D that are not specifically shown in FIG. 2 (e.g., one or more data agents, etc.). The system 200 may include one or more of each component. All components of the system 200 can be in direct communication with each other or communicate indirectly via the client 220, the storage manager 210, the media agent 270, or the like. In certain embodiments, some of the components in FIG. 2 shown as separate components can reside on a single computing device, or vice versa. For example, the partial file restore module 250 can be on the media agent 270 or on a separate computing device.

With further reference to FIG. 2, the interaction between the various components of the exemplary data storage system will now be described in greater detail with respect to data flow steps indicated by the numbered arrows.

Files in primary storage may be copied to secondary storage, e.g., as part of a backup, archive, or other secondary copy operation. The copies of files in secondary storage may be referred to as secondary copies of the files. Partial file restore may refer to restoring a portion of a secondary copy of a file, instead of restoring the entire secondary copy. In many cases, only a portion of the secondary copy may be needed. For example, the user may select a video file for playback, where the video file resides in secondary storage. But the user may want to start watching from a certain point into the movie. In such case, restoring only the desired portion of the secondary copy can save a significant amount of time, especially for large files like video files.

The user may indicate the portion of the secondary copy to restore using an interface of the native application associated with the file. For example, in case of a video file, the user may drag the playback slider in the graphical user interface (GUI) of a video playback application to a particular point from which the user wishes to view the video. The application can determine the application offset that corresponds to the point selected by the user in the GUI, and the application offset can designate the starting position for the portion of the file to be restored. The application may indicate the application offset for the starting point of the portion, or indicate the application offsets for both the starting point and end point of the portion. However, application offsets may not map to corresponding offsets in the secondary copy. For instance, secondary copies may include backup-related metadata at the beginning, e.g., in the header.

In addition, the data for the secondary copies may have been deduplicated, compressed, etc. Therefore, there is a need for mapping the application offsets to the secondary copy offsets in an easily accessible and efficient manner. The system 200 can provide one or more in-chunk indexes that include information about the mapping between the application offsets and the secondary copy offsets.

As explained above, a "chunk" may refer to logical data units in which secondary copies are stored. Secondary copies may be formatted and/or organized as a series of chunks, and may be written to secondary storage on a chunk-by-chunk basis. The chunk size can be defined according to the requirements of the system 200 (e.g., 512 MB, 1 GB, 2 GB, 4 GB, or 8 GB chunks). Formatting secondary copies in chunks can facilitate efficient communication and writing to secondary storage devices. For example, a larger chunk size can provide better throughput when writing data to secondary storage (e.g., tape media). A chunk may include multiple files, and a file may span across multiple chunks. FIG. 2 illustrates chunks $C_1$ through $C_n$ 285 in Storage Device 1 280*a*. As shown, chunk $C_2$ 285*b* includes multiple files (files F1 and F2). File F3 spans across multiple chunks. File F3 starts in chunk $C_2$ 285*b*, and continues through chunk $C_3$ 285*c* and one or more subsequent chunks (not shown). Chunks are explained in more detail above.

Each chunk may have associated metadata information or index files. An in-chunk index can include the mapping information between the application offsets and secondary copy offsets for one or more files. The in-chunk index may be included in the chunk metadata information, or may be an index file associated with the chunk. In-chunk indexes will be explained in more detail with respect to data flow step 2.

At data flow step 1, the storage manager 210 initiates backup of primary storage data to secondary storage. The backup (or other secondary copy operation) may run according to a schedule, at user request, based on a storage policy such as any of the storage policies described herein, based on certain events, etc. A schedule may be based on the passage of a pre-determined amount of time, such as on a regular basis (e.g., after a particular time interval, such as a certain number of hours or days), or on an intermittent basis. Backup may also be event-based and may be triggered by certain events. Backup can be implemented as one or more storage policies, and the storage manager 210 may manage such storage policies. In some embodiments, the system 200 may provide partial file restore feature as an option during backup. For example, the system administrator may select partial file restore as one of the backup parameters, causing the system 200 to create an in-chunk index in the backup copy to enable later partial file recovery.

The storage manager 210 may instruct one or more media agents 270 to copy the data from primary storage (e.g., information store 230) to secondary storage (e.g., storage devices 280). A media agent 270 may write data to a buffer in order to copy the data to secondary storage. The buffer may have a fixed size. The buffer size can be selected based on the bandwidth and other requirements of the system 200 (e.g., 64 KB, etc.). The amount of data written to the buffer can vary depending on each write operation. For instance, the amount of data that is written in a write operation can range anywhere from greater than 0 to the size of the buffer. Accordingly, the amount of data written to the buffer can be dynamic and indeterminate. Moreover, as will be described further, mapping entries in the in-chunk index are generally written to the chunk for a given portion of the file at the time that portion is written to the secondary storage device using the buffer. It can be important that the mapping entries (e.g., application offset/secondary copy offset pairs) are stored at the time of the corresponding buffer write. For example, it would be difficult or impractical to determine the correct mapping information at a later point in time, after one or more subsequent buffer writes, due of the indeterminate nature of the buffer write size.

The storage manager 210 and/or the media agents 270 may store information relating to the backup in their respective indexes 215, 275. For example, the storage manager index 215 can include information about which backup copies and/or operations are associated with which media agents 270. In FIG. 2, a first backup B1 and a second backup B2 are associated with Media Agent 1 270*a*, and a third backup B3 and a fourth backup B4 are associated with Media Agent 2 270*b*. The media agent index(es) 275 can include information about which files are associated with which backup copies and/or operations and any related information (e.g., beginning offset of a file in a backup copy). In FIG. 2, the index 275*a* for Media Agent 1 270*a* indicates that files F1, F2, and F3 are associated with backup B1, and that file F4 is associated with backup B2. The media agent index 275*a* also includes information about the beginning offset of each file in the backup copy, e.g., the location in the backup copy at which the particular file begins. For instance, file F1 in backup B1 begins at offset 01; file F2 in backup B1 begins at offset 02; file F3 in backup B1 begins at offset 03; and file F4 in backup B2 begins at offset 04.

The media agents 270 may copy and store the data in the storage devices 280 in chunks 285. In FIG. 2, files F1, F2, F3, and F4 are stored in various chunks 285 (e.g., chunks $C_1$ through $C_n$). File F1 starts in chunk $C_1$ 285*a* and ends in chunk $C_2$ 285*b*; file F2 starts and ends in chunk $C_2$ 285*b*; file F3 starts in chunk $C_2$ 285*b* and continues through at least chunk $C_3$ 285*c*; and file F4 starts in chunk $C_n$ 285*d*. A chunk 285 can contain multiple files like chunks $C_1$ 285*a*, $C_2$ 285*b*, and $C_n$ 285*d*. Or a chunk 285 can contain one file like chunk $C_3$ 285*c*. A file can be stored in one chunk 285 like file F2, or can be stored in multiple chunks 285 like files F1 and F3. As shown in FIG. 2, a backup copy can be stored in multiple chunks 285. For instance, data for backup B1 is stored in chunks $C_1$, $C_2$, $C_3$ through $C_n$ 285.

At data flow step 2, the partial file restore module 250 creates the in-chunk index 255 entry for the current portion of a file being processed. The partial file restore module 250 creates one or more in-chunk indexes 255 for files that are being copied to secondary storage. As explained above, the in-chunk index 255 entry for the current portion of the file may be written to secondary storage at the time the portion of the file is written to secondary storage.

The partial file restore module 250 may be a part of or associated with a media agent 270. The partial file restore module 250 creates the in-chunk index(es) 255, for example, during a backup. While described with respect to a backup copy operation for the purposes of illustration, the techniques described herein are compatible with other types of storage operations, such as, for example, replication, snapshots, archiving and the like. A description of these and other storage operations compatible with embodiments described herein is provided above. For example, the in-chunk index 255 may be created during archiving, instead of a backup.

As mentioned above, the application offsets for a file may not map exactly to corresponding secondary copy offsets. Secondary copies can include backup related metadata and/or header information, and data for secondary copies may be deduplicated and/or compressed during backup. Therefore, the corresponding offset in the secondary copy may not be easily calculated or determined, and locating the corresponding offset can become complicated. Accordingly, the system 200 may provide a mapping between application offsets and the corresponding secondary copy offsets. Such mapping information can be especially useful for locating particular positions in large files. To allow for granular access, the mapping information may include the application offset and the corresponding secondary copy offset at various points throughout the file, at a selected frequency (e.g., every N bytes).

The mapping information for a file can be included in an in-chunk index 255 for the chunk 285 the file is stored in. As explained above, a chunk 285 may include metadata information and/or index files associated with the chunk 285. The in-chunk index 255 may be a part of the metadata information and/or may be one or more index files for the chunk 285. The in-chunk index 255 for a chunk 285 can be written to storage devices 280 with the chunk 285, e.g., as part of the chunk metadata information or as a chunk index file(s). The mapping information for a secondary copy can become quite extensive since mapping can be created for a number of points in the file. By storing the in-chunk index 255 in-chunk on the secondary storage devices 280, the system 200 can advantageously maintain the storage manager index 215 and/or the media agent index(es) 275 at manageable sizes.

In some embodiments, the in-chunk index 255 may be stored in the storage manager index 215 and/or the media agent index(es) 275, in addition to and/or instead of storing in storage devices 280 with the chunk 285 itself. For example, some or all of the in-chunk index 255 may be accessible in the storage manager index 215 and/or the media agent index(es) 275, e.g., for faster searching within certain files.

The in-chunk index 255 can include the mapping information for all files in the chunk 285. For example, in FIG. 2, the in-chunk index 255 for chunk $C_1$ 285a can include the mapping information for file F1 as well as any other files in chunk $C_1$ 285a. The in-chunk index 255 may be stored in one in-chunk index file. In some embodiments, a separate in-chunk index 255 can be created for each file in the chunk 285, and the in-chunk index 255 for the different files may be stored in separate in-chunk index files.

If a file is stored across multiple chunks 285 (e.g., files F1 and F3), each chunk 285 that stores a portion of the file may include mapping information for that portion of the file in its in-chunk index 255. In FIG. 2, for file F1, the in-chunk index 255 for chunk $C_1$ 285a can include mapping information for the portion of file F1 stored in chunk $C_1$ 285a, and the in-chunk index 255 for chunk $C_2$ 285b can include mapping information for the portion of file F1 stored in chunk $C_2$ 285b. Similarly, for file F3, chunk $C_2$ in-chunk index 255 can include the mapping information for the portion of file F3 in chunk $C_2$ 285b, chunk $C_3$ in-chunk index 255 can include the mapping information for the portion of file F3 in chunk $C_3$ 285c, and so forth.

If a file spans across multiple chunks 285, the media agent index 275 may include information about which part of the file is stored in which chunk 285. For example, the media agent index 275 may indicate, for each chunk 285, the beginning application offset for the part of the file in the chunk 285 such that the system 200 can easily determine which chunk 285 should be accessed to find the portion of the file to be restored.

An in-chunk index 255 can include any information relating to mapping application offsets for a file to secondary copy offsets for the file. The in-chunk index 255 may be structured in many different ways. In an illustrative example, FIG. 2 shows the in-chunk index 255 as including various application offsets and corresponding secondary copy offsets. Secondary copy offsets may also be referred to as "archive offsets" as shown in FIG. 2, depending on the embodiment. If the in-chunk index 255 includes the mapping for all files in the chunk 285, the in-chunk index 255 may also provide information regarding which application offsets relate to which files in the chunk 285. For example, the in-chunk index 255 in FIG. 2 can have an additional column indicating the file to which the application offsets belong. In some embodiments, the system 200 may provide another index that includes information about the location of the starting application offset record and the end application offset record within the in-chunk index 255 for different files in the chunk 285.

Although not shown in FIG. 2, the in-chunk index 255 may also include the physical byte position in the chunk 285 that corresponds to the secondary copy offset. By including the physical chunk byte information, the system 200 can directly access the actual byte position for the secondary copy offset. This may be especially helpful when a file is stored across multiple chunks 285, and the secondary copy offset may not indicate directly where the point is located within the current chunk 285.

The granularity at which the mapping entries are included in the in-chunk index 255 may be set according to the requirements of the system 200. As an example, mapping entries in the in-chunk index 255 may be provided for at least every 1 MB. The granularity can become more refined by selecting a smaller interval, but the size of the mapping information would increase accordingly. The interval at which the mapping information is provided may not be a fixed interval. As explained with respect to data flow step 1, the media agents 270 may write data to the buffer when copying the data from primary storage to secondary storage, and the amount of data written to the buffer may differ from one write operation to the next write operation when iteratively writing the chunks with multiple buffer writes. Because of the dynamic nature of the amount of data that may be written to the buffer during each write, the mapping entries may not be created at fixed intervals (e.g., at every 1 MB). Thus, the interval may be irregular and may not be predictable (e.g., from between 1 MB and N MB for any given buffer write).

Respective application offsets and/or respective secondary file offsets (archive offsets) may be spaced from one another by the size of the interval. As an example, a first mapping entry of an in-chunk index 255 for a particular file has an application offset of 100 MB (and an archive offset of 500 MB). A 4 MB chunk of the file is written to the chunk the next interval. Thus, the next mapping entry written to the in-chunk index 255 includes an application offset of 104 MB, and an archive offset of 504 MB). In other embodiments, the application offset and/or archive offset for the next entry do not increase by exactly 4 MB, due to compression, embedded metadata or encryption information, or the like. For instance, the next entry may include an application offset of 104 MB, but an archive offset of 503 MB, where compression is applied to the secondary copy of the file.

In FIG. 2, the in-chunk index 255 illustrates mapping information for file F1. As mentioned above, an in-chunk index 255 can include the mapping information for all files in the chunk 285. The in-chunk index 255 in FIG. 2 includes application offsets and corresponding archive offsets. For example, application offset $x_1$ corresponds to archive offset $y_1$; application offset $x_2$ corresponds to archive offset $y_2$;

application offset $x_3$ corresponds to archive offset $y_3$; and application offset $x_n$ corresponds to archive offset $y_n$. Application offset $x_n$ corresponds to point $x_n$ indicated in file F1 235 in the information store 230. As explained above, the interval between application offsets may not be fixed. For example, the interval between application offset $x_1$ and application offset $x_2$ may be different from the interval between application offset $x_2$ and application offset $x_3$. In addition, the interval between archive offsets may not be fixed. For example, the interval between archive offset $y_1$ and archive offset $y_2$ may be different from the interval between archive offset $y_2$ and archive offset $y_3$. The interval between archive offsets may vary due to compression, deduplication, etc.

At data flow step 3, the media agent 270 writes the current portion of the file and the corresponding in-chunk index 255 entry to the secondary storage device 280. As mentioned above, the in-chunk index 255 can be copied to the storage devices 280 as a part of the chunk metadata and/or as a chunk index file(s). In this manner, the amount of information in the storage manager index 215 and/or the media agent index(es) 275 can be maintained at a manageable level. The system 200 can repeat data flow steps 2 and 3 for each buffer write until the backup is complete.

Figure 3:
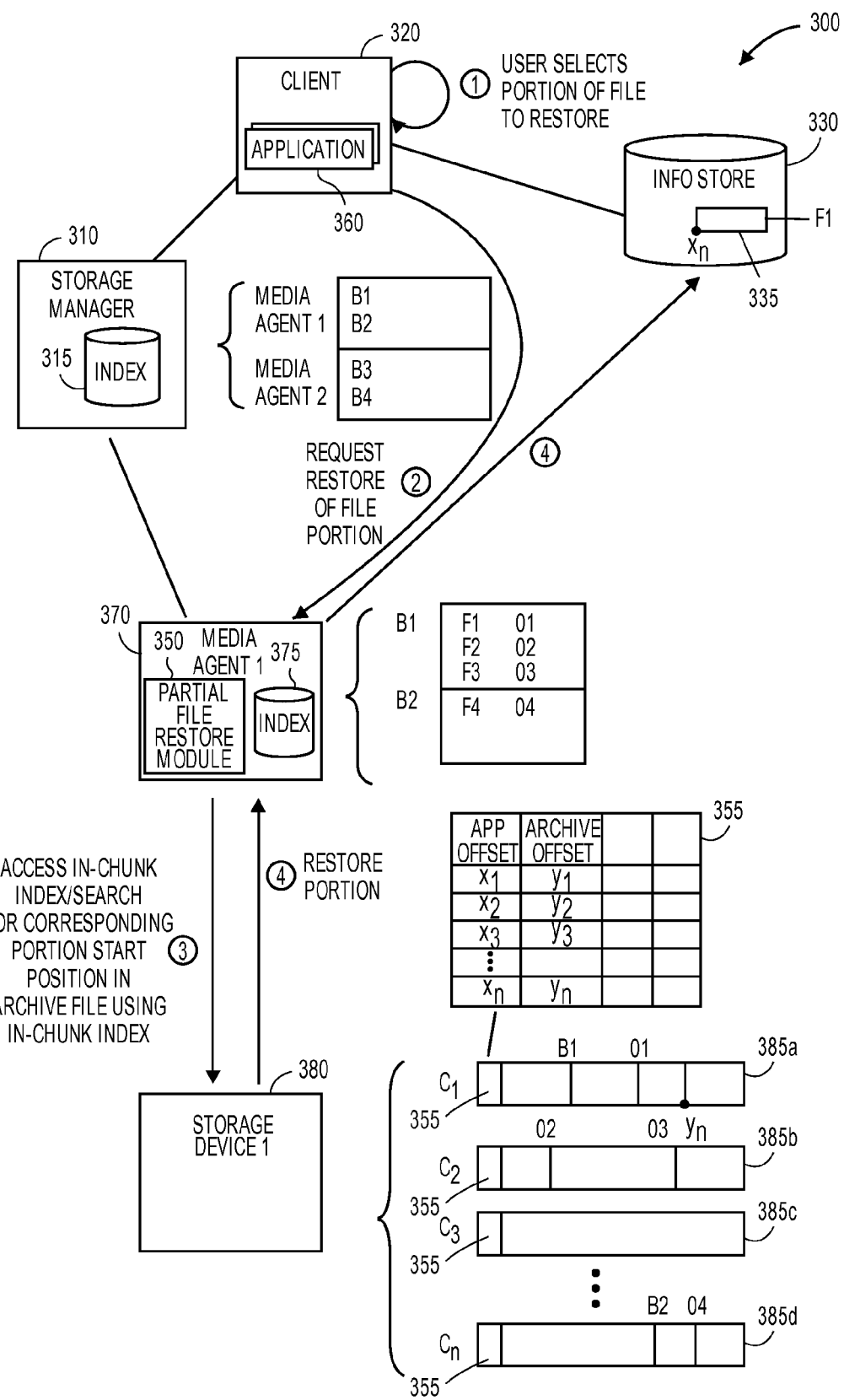
FIG. 3 is a data flow diagram illustrative of the interaction between the various components of another exemplary storage system configured to implement partial file restore, according to certain embodiments.

FIG. 3 is a data flow diagram illustrative of the interaction between the various components of another exemplary storage system 300 configured to implement partial file restore, according to certain embodiments. As illustrated, the exemplary data storage system 300 includes a storage manager 310, a client 320, an information store 330, one or more partial file restore modules 350, one or more applications 360, a media agent 370, and one or more secondary storage devices 380. The system 300 and corresponding components of FIG. 3 may be similar to or the same as the system 100, 200 and similarly named components of FIGS. 1D and 2. Moreover, depending on the embodiment, the system 300 of FIG. 3 may additionally include any of the other components shown in FIG. 1D that are not specifically shown in FIG. 3 (e.g., one or more data agents, etc.). The system 300 may include one or more of each component. All components of the system 300 can be in direct communication with each other or communicate indirectly via the client 320, the storage manager 310, the media agent 370, or the like. In certain embodiments, some of the components in FIG. 3 shown as separate components can reside on a single computing device, or vice versa. For example, the partial level restore module 350 can be on the media agent 370 or on a separate computing device.

With further reference to FIG. 3, the interaction between the various components of the exemplary data storage system will now be described in greater detail with respect to data flow steps indicated by the numbered arrows.

At data flow step 1, the user selects a portion of a file to restore using partial file restore, e.g., at a client 320. The user may browse the files that have been moved or copied to secondary storage via a user interface. For instance, the user interface may be a file browsing interface (e.g., Windows Explorer) provided by the operating and/or file system executing on the client device 320. Or the user may access the files using the interface of the native application used to view or otherwise access the file (e.g., a video playback application, word processing application, or the like). The system 300 may provide metadata about the files, and a file may be opened using the application(s) 360 associated with the file. The user interface may in some cases also be provided through a file browsing interface provided by the storage manager 310 (e.g., the storage manager 310 console).

In an illustrative example, the user accesses a video file that have been archived (or otherwise copied) to secondary storage devices 380. According to certain embodiments, the file resides in secondary storage and is no longer in the native format of the source application, or is otherwise not directly usable by the source application. However, this fact is transparent to the user in certain embodiments, because the file is logically accessible via the file system executing on the client 320 via a mount point to the secondary copy. Thus, when the user opens the file (e.g., by opening the file using a file interface of a video playback application running on the client computing device 320, or by clicking on a file icon in Windows Explorer or another file system browser), the client 320, via the mount point, forwards the request to open the file to the storage manager 310.

The user may choose the portion of the file to restore by interacting with the application 360 associated with the file. For instance, the user selects a portion of the file for playback or other access. As one example, the user may open a video file and scroll to a certain point in the video, thereby selecting the starting point for the portion to restore. As another illustrative example, a user may drag a slider icon of a word processing application to scroll to a position towards the end of a very large text document that is being accessed from secondary storage. The word processing application may buffer the document such that the entire document is not initially accessed. In such a case, instead of requesting a restore of the entire contents of the file from the initial position in the document to the scrolled-to position, the client 320 may request that only a portion of the file is restored. For instance, the portion may correspond to one or more application offsets in proximity to the scrolled-to position in the document (e.g., corresponding to a certain buffered portion of the document which includes the scrolled-to position). In some embodiments, when the file is initially opened, the application may request to restore only the beginning portion of the file, and only the range of data corresponding to that portion may be restored from secondary storage.

When the user indicates the portion to be restored, the application 360 can calculate and/or determine one or more corresponding application offsets for the portion. For example, if the user scrolls to a point in a video file or in a text document, the application 360 may designate the corresponding application offset as the start of the portion to restore. The system 300 may designate the number of bytes to restore from the starting application offset (e.g., to the end of the file, a fixed number of bytes for buffering, etc.). In some embodiments, the application 360 can provide both the starting application offset and the end application offset.

At data flow step 2, the client 320 requests a restore of a selected portion of the file. After the application 360 determines the starting application offset (or both the starting and end application offsets), the client 320 may, via the mount point, send a request to the storage manager 310 to restore the portion of the file. For instance, based on the user's input, the application 360 may determine the application offset(s) and forward a request including the offset(s) and any other appropriate information (e.g., file ID, starting application offset, etc.) to the file system executing on the client 320. In turn, the file system, via the mount point, forwards a request, again including the offset(s) and any other appropriate information (e.g., file ID, starting application offset, etc.) to the storage manager 310 to restore the selected portion of the file. In some embodiments, a data agent executing on the client 320 may also be involved in generating the request to the storage manager.

Upon receipt of the request, the storage manager 310 may instruct the appropriate media agent(s) 370 to restore the selected portion, e.g., by referring to the storage manager index 315. For example, the request to restore may be for file F1, which is stored in backup B1 and in Storage Device 1 380. The storage manager 310 can determine, e.g., by referring to the index 315, that the data for file F1 is part of backup B1 and that backup B1 is associated with Media Agent 1 370. The storage manager 310 then can instruct Media Agent 1 370 to restore the selected portion.

At data flow step 3, the partial file restore module 350 accesses the in-chunk index 355 for the chunk 385 in which the selected portion is stored, and searches for the corresponding portion start position in the secondary copy using the in-chunk index 355. The partial file restore module 350 may be a part of or associated with a media agent 370. The media agent 370 that is instructed to restore the selected portion may instruct its associated partial file restore module 350 to access and search through the in-chunk index 355.

In FIG. 3, the secondary copy is referred to as an "archive file," but the secondary copy can be created through various types of storage operations, such as, for example, backup, replication, snapshots, and the like. Similarly, the in-chunk index 355 may also be created while performing various types of storage operations, such as, backup, replication, snapshots, archiving, and the like. The in-chunk index 355 may be created in a similar manner and may have a similar format as described in connection with FIG. 2.

In a specific, illustrative example relating to FIG. 3, the user selects file F1, which has been copied to Storage Device 1 380. The user opens file F1 using the application 360 associated with file F1. The user interacts with the application to select a portion of the file to restore which corresponds to a starting application offset $x_o$. File F1 starts in Chunk $C_1$ 385a and ends in Chunk $C_2$ 385b. As explained with respect to FIG. 2, if a file is stored across multiple chunks 385, the media agent index 375 may include information about which part of the file is stored in which chunk 385. For instance, the media agent index 375 may include information about the starting application offset for the file portion in each chunk 385. In this example, Media Agent 1 370 may indicate that the starting application offset for file F1 in chunk $C_2$ 385b is $x_p$. Since the user selected application offset is $x_o$, which is prior to $x_p$, Media Agent 1 370 can determine that it should access the in-chunk index 355 for chunk $C_1$ 385a. For the chunk 385 in which the file begins, the media agent index 375 may not need to include information about the starting application offset for the file portion in the chunk 385.

Because the interval between the application offsets may not be fixed, as explained with respect to FIG. 2, the partial file restore module 350 may need to search through the application offsets in the in-chunk index 355. But the number of application offsets in the in-chunk index 355 can be quite large (e.g., for video or other media files), and therefore, there is a need to locate the corresponding secondary copy offset in a quick and efficient manner. Various search techniques may be used to search through the mapping information to locate the corresponding secondary copy offset.

One example of such technique is the binary search. For instance, the partial file restore module 350 may start the search in the middle of the application offsets. If the middle application offset is the same as the user application offset, the partial file restore module 350 can use the corresponding secondary offset. If the requested application offset is less than the middle application offset, the partial file restore module 350 compares the user application offset with the middle application offset of the lower half of the application offsets. If the user selected application offset is greater than the middle application offset, the partial file restore module 350 compares the user application offset with the middle application offset in the upper half of the application offsets. The partial file restore module 350 can repeat the binary search process until an application offset equal to the user application offset is found or until it is determined that such offset does not exist.

Depending on the level of granularity and other factors (e.g., whether the interval is fixed or not), the in-chunk index may not include a mapping entry having an application offset that exactly corresponds to the requested application offset. In such cases, the partial file restore module 350 can use the binary search or other search process to locate an application offset in proximity to the requested application offset (e.g., the nearest application offset prior to the requested application offset) and restore starting from that application offset. In such a case, in order to inform the application 360 that the restored file portion does not begin exactly at the requested location, the partial file restore module 350 or other component can send information back to the application 360 indicating the actual starting application offset for the restored portion.

In the specific example, the partial file restore module 350 accesses the in-chunk index 355 for chunk $C_1$ 385a and performs a binary search to locate the entry in the in-chunk index including an application offset that is the same as or closest to the desired application offset $x_o$. The in-chunk index 355 for file F1 does not include an entry having the application offset $x_o$, and the closest application offset that is included in an entry in the in-chunk index is $x_n$, which is less than $x_o$. Accordingly, the partial file restore module 350 determines that the nearest secondary copy offset that comes before the requested offset is $x_n$.

At data flow 4, the media agent 370 restores the selected portion. Once the partial file restore module 350 locates the corresponding or nearest application offset, the media agent 370 can begin restoring the data for the user selected portion. In some embodiments, the in-chunk index 355 may include information about the physical chunk byte position for the secondary copy offsets, and the media agent 370 can seek to the physical byte position and start restoring from that position. The media agent 370 can restore the portion to primary storage (e.g., the information store 330). The media agent 370 may send any related information to the application 360, such as the restore application offset, corresponding secondary copy offset, etc. For example, if the application offset does not map exactly to the user selected application offset, the media agent 370 can send the actual application offset information to the application 360. The application 360 can adjust the application offset accordingly when the user accesses the restored portion.

In this manner, the system 300 may restore the user selected portion of a file from secondary storage in a fast and efficient manner. By providing mapping information between application offsets and secondary copy offsets, the system 300 can quickly locate the corresponding or nearest secondary copy offset for the user selected application offset. Using the in-chunk index 355, the system 300 can provide a fast response time for the restore and a positive user experience. In addition, the in-chunk index 355 may be stored in secondary storage, reducing the amount of data included in the storage manager index 315 and/or the media manager index(es) 375. Partial file restore can reduce the amount of time and resources for restoring files from secondary storage.

Figure 4:
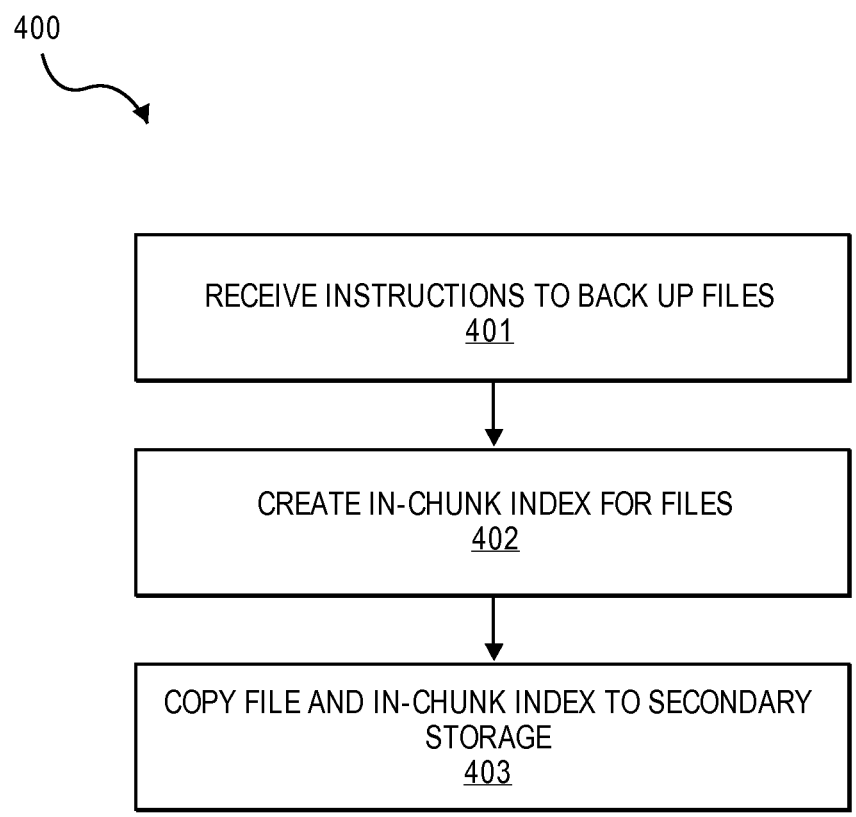
FIG. 4 is a flow diagram illustrative of one embodiment of a routine for creating in-chunk index for partial file restore.

FIG. 4 is a flow diagram illustrative of one embodiment of a routine for creating in-chunk index for partial file restore according to certain embodiments. The routine 400 is described with respect to the system 200 of FIG. 2. However, one or more of the steps of routine 400 may be implemented by other data storage systems, such as those described in greater detail above with reference to FIG. 1D. The routine 400 can be implemented by any one, or a combination of, a client, a storage manager, a data agent, a partial file restore module, a media agent, and the like. Moreover, further details regarding certain aspects of at least some of steps of the routine 400 are described in greater detail above with reference to FIG. 2. Although described in relation to backup operations for the purposes of illustration, the process of FIG. 4 can be compatible with other types of storage operations, such as, for example, migration, snapshots, replication operations, archiving, and the like.

At block 401, the storage manager 210 receives instructions to back up files. The storage manager 210 may instruct one or more media agents 270 to initiate backup.

At block 402, the partial file restore module 250 creates one or more in-chunk indexes 255 for the files. The partial file restore module 250 may be a part of a media agent 270. When the media agents 270 are instructed to perform a backup, the media agents 270 may instruct the respective partial file restore modules 250 to create the in-chunk index 255.

At block 403, the media agents 270 copy the files and the in-chunk indexes 255 to the secondary storage devices 280. The in-chunk index 255 for a chunk 285 can be stored with the chunk 285 in the storage devices 280. The in-chunk index 255 may be stored as a part of the chunk metadata and/or as one or more chunk index files.

As explained in connection with FIG. 2, an in-chunk index 255 entry may be created for each buffer write. For example, the partial file restore module 250 creates the in-chunk index 255 entry for the portion of the file being processed in the current buffer write operation, and the media agent 270 writes the portion of the file and the in-chunk index 255 entry to the storage device 280.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 5:
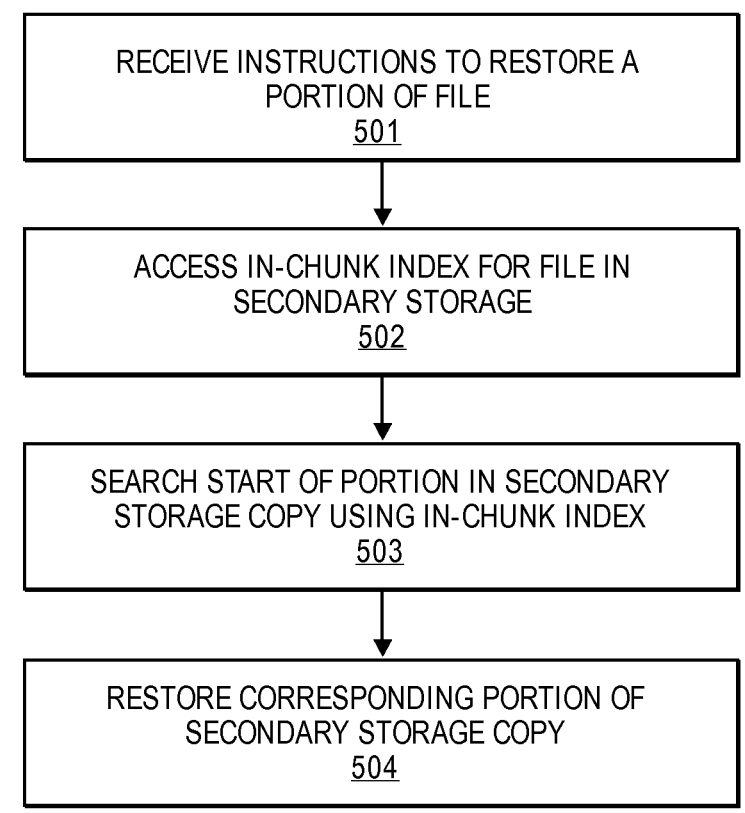
FIG. 5 is a flow diagram illustrative of one embodiment of a routine for restoring a file using partial file restore.

FIG. 5 is a flow diagram illustrative of one embodiment of a routine for restoring a file using partial file restore according to certain embodiments. The routine 500 is described with respect to the system 300 of FIG. 3. However, one or more of the steps of routine 500 may be implemented by other data storage systems, such as those described in greater detail above with reference to FIGS. 1D and 2. The routine 500 can be implemented by any one, or a combination of, a client, a storage manager, a data agent, a partial level restore module, a media agent, and the like. Moreover, further details regarding certain aspects of at least some of steps of the routine 500 are described in greater detail above with reference to FIG. 3. Although described in relation to backup operations for the purposes of illustration, the process of FIG. 5 can be compatible with other types of storage operations, such as, for example, migration, snapshots, replication operations, archiving, and the like.

At block 501, the storage manager 310 receives instructions to restore a portion of a file, e.g., from a client 320. The storage manager 310 may receive one or more application offsets for the portion to be restored. The storage manager 310 may determine which media agent(s) 370 should be instructed to restored the requested data (e.g., by referring to the storage manager index 315).

At block 502, the appropriate media agent(s) 370 accesses the in-chunk index 355 for the file in the secondary storage devices 370. For example, the media agent 370 may determine which chunk 385 stores the portion of the file to be restored (e.g., by referring to the media agent index 375). Once the media agent 370 determines the chunk 385 to be restored, the media agent 370 accesses the in-chunk index 355 for that chunk 385.

At block 503, the partial file restore module 350 searches for the start of the portion in the secondary copy using the in-chunk index 355. The partial file restore module 350 may be a part of the media agent 370, and the media agent 370 may instruct the partial file restore module 350 to search through the in-chunk index 355. The partial file restore module 350 can perform a search through the application offsets in the in-chunk index 355 to find the corresponding or nearest secondary copy offset.

At block 504, the media agent 370 restores the corresponding portion of the secondary copy from the storage devices 380. Once the partial file restore module 350 determines the corresponding or nearest secondary copy offset, the media agent 370 can restore the data starting from the secondary copy offset. The media agent 370 may restore a certain number of bytes from the secondary copy offset, or may restore to the end of the chunk or file. After the media agent 370 begins restoring the data, the application 360 can start accessing the restored data in the information store 330.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of partially restoring a secondary copy of a first file stored in a data storage system, comprising:
    using one or more computing devices comprising computer hardware:
        receiving an instruction to restore a portion of a secondary copy of a first file stored in a secondary storage subsystem to a primary storage subsystem for use by a software application that generated the first file, wherein data in the secondary storage subsystem, including the secondary copy of the first file, is stored in one or more chunks, and each chunk is a logical data unit for storing the data in the secondary storage subsystem in one or more secondary storage devices in the secondary storage subsystem,
        the instruction comprising a starting application offset corresponding to a beginning of the portion of the first file to be restored, the starting application offset associated with the software application;
        identifying a chunk stored in the secondary storage subsystem that includes a part of the secondary copy corresponding to the starting application offset;
        accessing an index for the chunk, wherein the index is stored in the chunk and both the index and the chunk are stored in the secondary storage subsystem, the index comprising a plurality of entries, a first entry in the plurality of entries providing a mapping between a first application offset of the first file and a corresponding first secondary storage offset, a second entry in the plurality of entries providing a mapping between a second application offset of a second file and a corresponding second secondary storage offset,
        wherein the first application offset is an offset within the first file and is associated with the software application, the first secondary storage offset is an offset within the secondary copy of the first file, and the first secondary storage offset within the secondary copy of the first file corresponds to the first application offset within the first file,
        wherein the mapping between the first application offset of the first file and the corresponding first secondary storage offset is stored in the first entry in response to data corresponding to the first application offset being written to a buffer for storage in the secondary storage subsystem during creation of the secondary copy, wherein creation of the secondary copy involves a series of transactions in which data is written to the buffer and then written from the buffer to the secondary storage devices, and wherein an amount of data written to the buffer in each transaction is not predetermined;
        iteratively searching application offsets of the plurality of entries in the index to determine that the first entry in the plurality of entries is usable to locate a portion in the chunk that includes data corresponding to the starting application offset; and using the first secondary storage offset of the first entry to restore the portion in the chunk from the secondary storage subsystem to the primary storage subsystem.

2. The method of claim 1, wherein the first application offset is the same as the starting application offset or is closer in value to the starting application offset than any other application offset in the plurality of entries.

3. The method of claim 1, further comprising, in response to determining that the first application offset is closer in value to the starting application offset than any other application offset in the plurality of entries, sending the first application offset that is closer in value to the starting application offset than any other application offset in the plurality of entries to the software application.

4. The method of claim 1, wherein the index is contained within the chunk.

5. The method of claim 1, wherein each of the one or more chunks is of equal size.

6. The method of claim 1, wherein the plurality of entries comprises:
a third entry comprising a third application offset and a third secondary storage offset that corresponds to the third application offset,
wherein a first interval between the first application offset and the second application offset is different from a second interval between the second application offset and the third application offset.

7. The method of claim 6, wherein a third interval between the first secondary storage offset and the second secondary storage offset is different from a fourth interval between the second secondary storage offset and the third secondary storage offset.

8. The method of claim 1, wherein the instruction comprises an end application offset indicating an end of the portion of the first file to be restored.

9. The method of claim 1, wherein a size of the portion in the chunk that is restored to the primary storage subsystem is a predetermined number of bytes from the first secondary storage offset in the first entry.

10. The method of claim 1, wherein the starting application offset is selected in a graphical user interface of the software application.

11. The method of claim 1, wherein the secondary copy comprises metadata information relating to the secondary copy.

12. The method of claim 1, wherein each entry in the plurality of entries comprises physical byte position information that indicates a byte position in the chunk that corresponds to the application offset in the respective entry.

13. The method of claim 12, wherein said using the first secondary storage offset of the first entry to restore a portion in the chunk comprises restoring a portion of the chunk that begins with a start position that is indicated by the physical byte position information.

14. The method of claim 1, wherein said determining that the first application offset referenced by the first entry in the plurality of entries corresponds to the starting application offset comprises performing a binary search on the plurality of entries.

15. The method of claim 1, wherein the secondary copy of the first file is deduplicated or compressed.

16. A data storage system for partially restoring a secondary copy of a first file, comprising:

a storage manager executing on computer hardware and configured to:

receive an instruction to restore a portion of a secondary copy of a file stored in a secondary storage subsystem to a primary storage subsystem for use by a software application that generated the first file, wherein data in the secondary storage subsystem, including the secondary copy of the first file, is stored in one or more chunks, and each chunk is a logical data unit for storing the data in the secondary storage subsystem in one or more secondary storage devices in the secondary storage subsystem, the instruction comprising a starting application offset corresponding to a beginning of the portion of the first file to be restored, the starting application offset associated with the software application; and one or more computing devices comprising computer hardware and configured to:

identify a chunk stored in the secondary storage subsystem that includes a part of the secondary copy corresponding to the starting application offset;

access an index for the chunk, wherein the index is stored in the chunk and both the index and the chunk are stored in the secondary storage subsystem, the index comprising a plurality of entries, a first entry in the plurality of entries providing a mapping between a first application offset of the first file and a corresponding first secondary storage offset, a second entry in the plurality of entries providing a mapping between a second application offset of a second file and a corresponding second secondary storage offset, wherein the first application offset is an offset within the first file and is associated with the software application, the first secondary storage offset is an offset within the secondary copy of the first file, and the first secondary storage offset within the secondary copy of the first file corresponds to the first application offset within the first file, wherein the mapping between the first application offset of the first file and the corresponding first secondary storage offset is stored in the first entry in response to data corresponding to the first application offset being written to a buffer for storage in the secondary storage subsystem during creation of the secondary copy, wherein creation of the secondary copy involves a series of transactions in which data is written to the buffer and then written from the buffer to the secondary storage devices, and wherein an amount of data written to the buffer in each transaction is not predetermined;

iteratively search application offsets of the plurality of entries in the index to determine that the first entry in the plurality of entries is usable to locate a portion in the chunk that includes data corresponding to the starting application offset; and use the first secondary storage offset of the first entry to restore the portion in the chunk from the secondary storage subsystem to the primary storage subsystem.

17. The system of claim 16, wherein the first application offset that is the same as the starting application offset or is closer in value to the starting application offset than any other application offset in the plurality of entries.

18. The system of claim 16, wherein the plurality of entries comprises:
- a third entry comprising a third application offset and a third secondary storage offset that corresponds to the third application offset,
- wherein a first interval between the first application offset and the second application offset is different from a second interval between the second application offset and the third application offset.

19. The system of claim 16, wherein each entry in the plurality of entries comprises physical byte position information that indicates a byte position in the chunk that corresponds to the application offset in the respective entry.

20. The system of claim 16, wherein the one or more computing devices iteratively search the application offsets of the plurality of entries in the index using a binary search.

* * * * *

UNITED STATES PATENT AND TRADEMARK OFFICE
CERTIFICATE OF CORRECTION

PATENT NO. : 9,804,930 B2
APPLICATION NO. : 14/152843
DATED : October 31, 2017
INVENTOR(S) : Manoj Kumar Vijayan Page 1 of 1

It is certified that error appears in the above-identified patent and that said Letters Patent is hereby corrected as shown below:

In the Specification

Column 10, Line 4, change "[ACLS])," to --[ACLs],--.

Column 34, Line 31, change "1166" to --116B--.

Column 34, Line 40, change "1166" to --116B--.

Column 34, Line 44, change "1126" to --112B--.

Column 34, Line 63, change "1166," to --116B,--.

Signed and Sealed this
Eighth Day of May, 2018

Andrei Iancu
*Director of the United States Patent and Trademark Office*